(12) United States Patent
Lackomar

(10) Patent No.: US 6,237,267 B1
(45) Date of Patent: *May 29, 2001

(54) ADVERTISING HANGING DISPLAY AND METHOD FOR TAXICARS OR OTHER COMMERCIAL VEHICLES

(75) Inventor: Steven S. Lackomar, Las Vegas, NV (US)

(73) Assignee: Media Services International, Ltd., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/431,148

(22) Filed: Nov. 1, 1999

Related U.S. Application Data

(63) Continuation of application No. 08/980,423, filed on Nov. 28, 1997, now Pat. No. 6,006,462.

(51) Int. Cl.[7] .................................................... B60R 7/04
(52) U.S. Cl. ................ 40/593; 40/643; 40/661; 108/44; 224/275; 297/188.06
(58) Field of Search .................... 40/593, 594, 617, 40/651, 654.01, 661, 643, 644; 297/188.04, 188.06; 224/275, 572; 108/44

(56) References Cited

U.S. PATENT DOCUMENTS

| 4,024,660 | * | 5/1977 | Goto ................................. 40/661 X |
| 4,131,313 | * | 12/1978 | Jacobs ............................. 224/275 X |
| 4,650,103 | * | 3/1987 | Mitchell ........................... 40/593 X |
| 5,226,576 | * | 7/1993 | Ellsworth ........................ 224/275 X |
| 5,878,672 | * | 3/1999 | Ostermann et al. ................... 108/44 |
| 6,006,462 | * | 12/1999 | Lackomar .............................. 40/593 |
| 6,105,839 | * | 8/2000 | Bell .................................... 224/275 |

* cited by examiner

Primary Examiner—Terry Lee Melius
Assistant Examiner—Robert G. Santos
(74) Attorney, Agent, or Firm—Harry M. Weiss; Jeffrey Weiss; Weiss & Moy, P.C.

(57) ABSTRACT

A display and method for holding printed material, such as advertising, are described for hanging on the back of a vehicle seat with its contents easily visible and accessible to a passenger. A transparent backboard having rear and front surfaces define transparent pockets for holding the advertising. A pair of hook and loop straps and pads secure the display to the back of the seat.

4 Claims, 2 Drawing Sheets

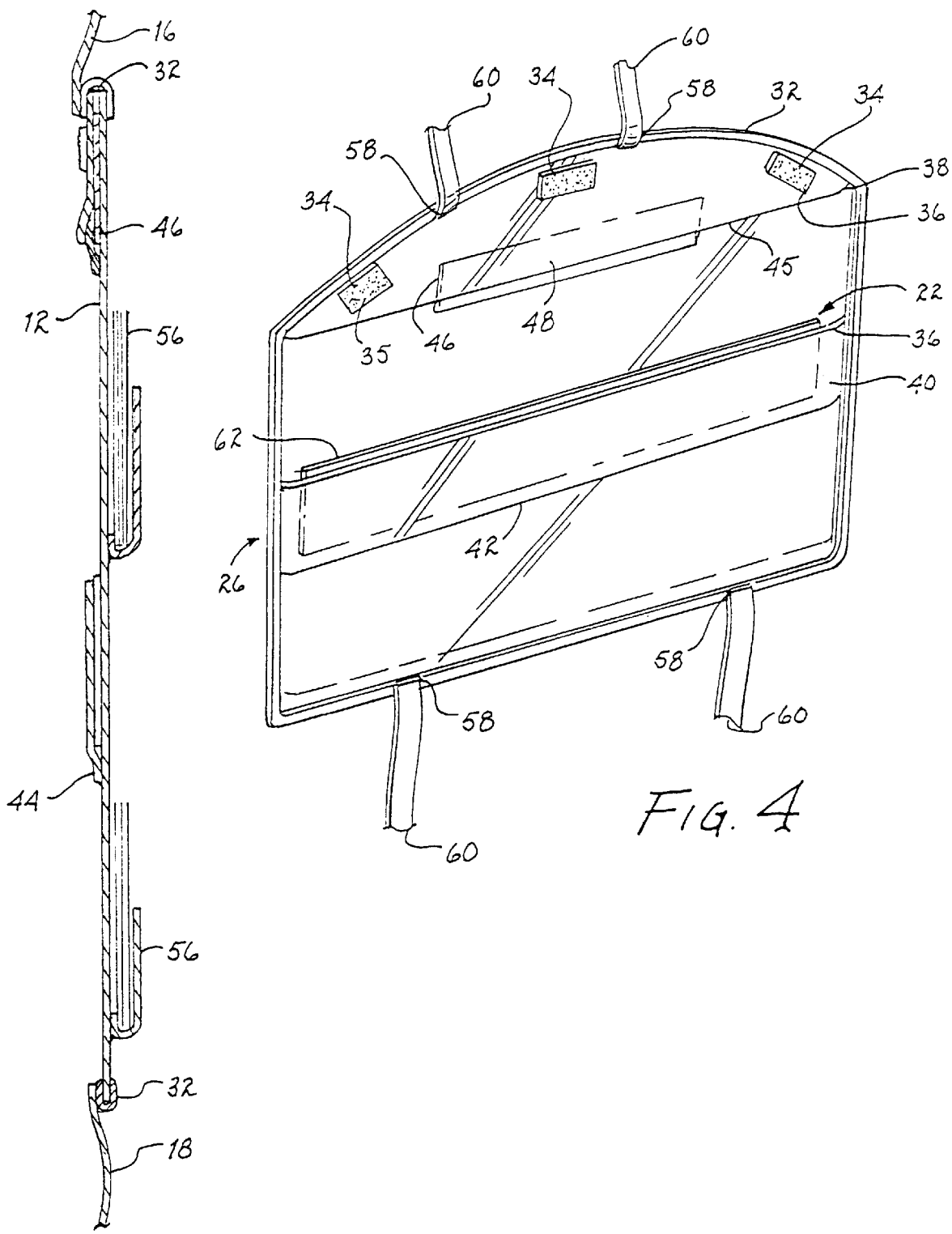

ADVERTISING HANGING DISPLAY AND METHOD FOR TAXICARS OR OTHER COMMERCIAL VEHICLES

RELATED PATENT APPLICATION

This patent application is a continuation of my earlier patent application Ser. No. 08/980,423, filed Nov. 28, 1997, now U.S. Pat. No. 6,006,462, entitled "HANGING DISPLAY AND METHOD FOR VEHICLES".

FIELD OF THE INVENTION

This invention relates generally to an advertising display and method, and more specifically, this invention relates to an advertising hanging display and method for holding advertising and/or postcards for use in taxicabs or other commercial vehicles.

BACKGROUND OF THE INVENTION

Advertisements designed to elicit interest in products, services and/or to provide information can be found everywhere, albeit with differing impact. Advertising in taxicabs and other commercial vehicles is particularly attractive because their passengers are a captive audience for whom the vehicle and its driver may be the first and/or only contact in a particular area. Since the passenger's ride may be extended, the time exposure to the advertisement is also extended. The mobility and extensive use of the taxicab also makes the advertising reach a broader group of people.

Although such advertising is particularly effective, there is not enough space in most taxicabs and other commercial vehicles to keep or display advertising material, particularly in plain view of its passengers. Furthermore, even when available, the materials containing advertising to be picked up by passengers cannot be sufficiently contained so that the vehicle interior becomes cluttered and messy.

Accordingly, there has been a need for a novel vehicle hanging display for holding advertising material to be given away which is sturdy and easy to use. Such a display is also needed to hold the advertising materials, such as postcards or the like, in a neat and orderly fashion in plain view of the vehicle passengers. Further, a display is needed which makes its contents visible and accessible to the passenger. The present invention fulfills these needs and provides other related advantages.

SUMMARY OF THE INVENTION

It is an object of this invention to provide an improved display and method therefor for use in vehicles.

It is a further object of this invention to provide an improved display and method therefor for use in commercial-type vehicles such as taxis, limousines, etc.

It is a still further object of this invention to provide an improved display and method therefor for use in commercial vehicles which contain advertising materials such as postcards for the use of passengers.

The present invention resides in a display and method for vehicles that hangs on the back of a vehicle seat and neatly holds printed material such as postcards or the like for viewing and/or use by a passenger. The display comprises, generally, base means for defining a plurality of pockets for holding the printed material and means for fastening the base means to the back of the seat.

In a preferred form of the invention, the display and method provide a neat and orderly device for containing advertising material in the interior of the vehicle. The base means includes a transparent generally rectangular backboard which defines the plurality of transparent pockets on both a rear and front surface of the backboard. The backboard includes a fabric band extending completely around its perimeter and a plurality of hook and associated loop pads on the backboard rear surface near a top edge, commonly referred to as Velcro® fasteners, for removable adhesion to the back of the seat.

The backboard rear surface includes a first pair of spaced apart and vertically disposed horizontally-oriented flaps. The flaps are sewn to the rear surface of the backboard to define rearwardly-opening substantially rectangular horizontally elongated upper and lower pockets. The pockets are adapted to hold advertising banners or the like, the printing on which can be seen through the pockets. A narrow horizontally-oriented elongated support strip is sewn onto the rear surface at an upper portion of the backboard to hold the advertising material as the upper pocket opens at the bottom. The flap of the upper pocket covers the narrow support strip.

The backboard front surface includes a second pair of spaced apart and vertically disposed horizontally-oriented flaps. The second pair of flaps are sewn to the front surface of the backboard to define a pair of rows of side-by-side pockets utilized to securely hold postcards or the like.

The fastening means, in the preferred embodiment, comprises means for securing the baseboard to the back of the vehicle seat including a vehicle headrest. The fastening means includes a first and second pair of straps preferably formed from hook and loop tape, commonly known as a Velcro® tape fastener. One strap of each pair is provided with either the hook or loop pad while the other strap of each pair is provided with the other portion of the Velcro® fastener. The first pair of straps is fastened at a fixed end to the top edge of the baseboard and secured around the vehicle headrest at a free end. The second pair of straps is fastened at a fixed end to a bottom edge of the baseboard and secured to the vehicle seat.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG, 3 is an enlarged sectional view of the hanging display, taken generally along the line 3—3 of FIG. 2: and FIG. 4 is an enlarged rear view of the hanging display of FIG. 1.

DETAILED DESCRIPTION OF THE PREFERRED EMBODIMENT

Figure 1:
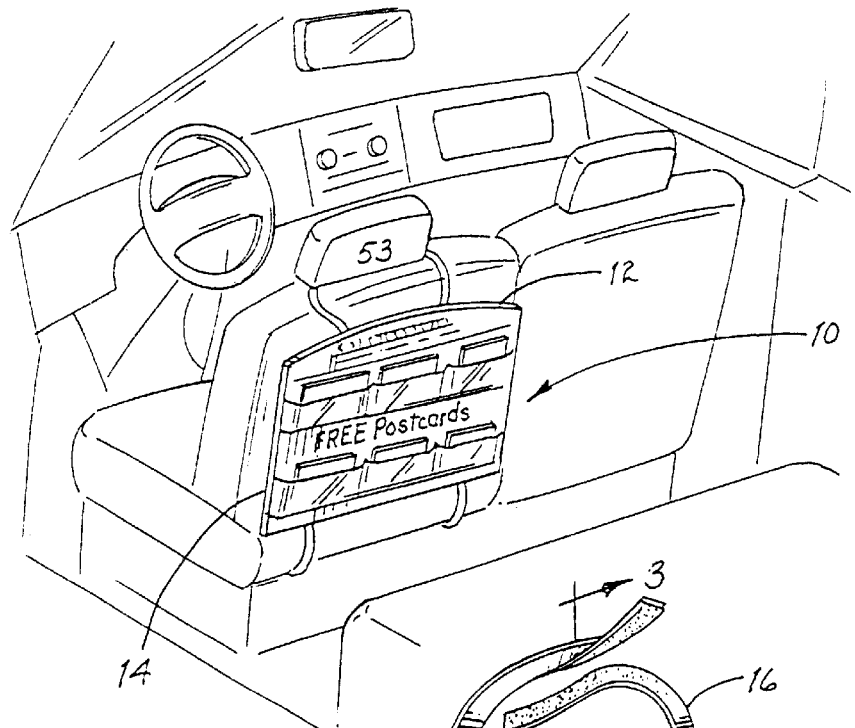
FIG. 1 is a perspective view of a hanging display embodying the invention illustrating the front of the display as secured on the back of an exemplary motor vehicle seat.

As shown in the drawings for purposes of illustration, the present invention is concerned with a hanging display for vehicles, particularly taxicabs and other commercial vehicles, which hanging display is generally designated in the accompanying drawings by the reference number 10.

Referring to FIGS. 1–4, the hanging display comprises, generally, a backboard 12 which is secured on the back of a vehicle seat 14, a first and second pair of straps 16 and 18 which secure the backboard 12 to the seat 14, and a plurality of pockets 20, 38, and 40 for receiving paper or printed material 22 arm>such as advertising.

In accordance with the present invention, and as illustrated with respect to a preferred embodiment in FIGS. 1–4, the hanging display 10 is configured for placement on the back of the vehicle seat 14 such that the printed material 22 is visible to the passenger. The backboard 12 and pockets 20, 38 and 40 are preferably constructed of a moderately rigid yet fluid material and transparent, for example plastic, to enable the passenger to see the contents.

The backboard 12 provides the component for securing the display 10 to the vehicle seat 14, and includes a front surface 24 and a rear surface 26. The backboard 12 is preferably generally rectangular, although a top edge 28 is preferably more rounded than a bottom edge 30. The backboard 12 preferably includes a band 32 extending completely around the perimeter of the backboard 12. The band 32 is preferably fabric or reinforced fabric sewn on or otherwise affixed to the backboard 12. As illustrated in FIGS. 3 and 4, the backboard rear surface 26 includes a plurality of hook and associated loop pads 34 near the top edge 28, commonly referred to as Velcro® fasteners. Each of the hook and loop pads 34 has a first adhesive backing (not shown) for adhesion to the backboard 12. A second adhesive backing 35 of the associated pad is covered by a peel-off backing strip (not shown) until such time as the backboard 12 is adhered to the back of the seat 14. The backboard 12 may be adhered to the back of the seat 14 by other methods known in the art without departing from the spirit and scope of this invention.

As illustrated in FIGS. 3 and 4, the backboard rear surface 26 includes a first pair of spaced apart and vertically disposed horizontally-oriented flaps 36. The flaps 36 are sewn to the rear surface 26 of the backboard 12 to define rearwardly-opening substantially rectangular horizontally elongated upper and lower pockets 38 and 40. A first visible bottom seam 42 is formed near a lower edge 44 of the elongated lower pocket 40. The lower edge 44 of the elongated upper pocket 38 is a free edge 45 as the upper pocket 38 opens at the bottom. A top seat (not shown) in the upper pocket 38 and a pair of side seams (not shown) for each of the upper and lower pockets 38 and 40 are hidden under the band 32. A narrow horizontally-oriented elongated support strip 46 is sawn onto the rear surface 26 of the backboard 12 forming a second visible seam 48 extending horizontally across an upper half of the backboard 12. The purpose for the narrow support strip 46 will be hereinafter described. The second visible seam 48 and the free edge 45 of the elongated upper pocket 38 are substantially coextensive. As illustrated in FIG. 3, the flap 36 of the upper pocket 38 covers the narrow support strip 46 which lays substantially flat against the rear surface 26 of the backboard 12 when there is no paper or printed material inside the upper pocket 38.

Figure 2:
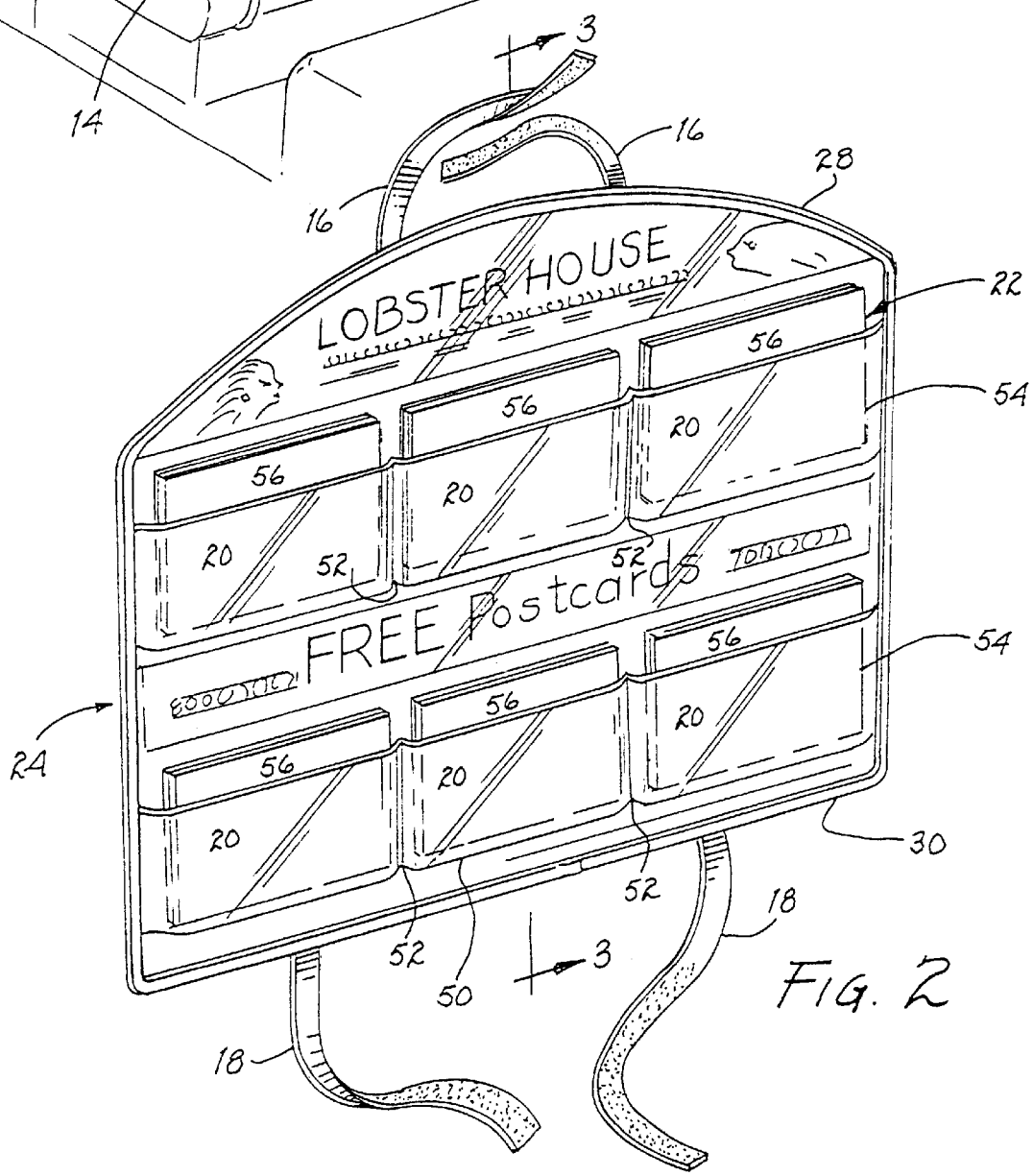
FIG. 2 is an enlarged view of the hanging display of FIG. 1.

As illustrated in FIG. 2, the backboard front surface 24 includes a second pair of spaced apart and vertically disposed horizontally-oriented flaps 50. The second pair of flaps 50 are sewn to the front surface 24 of the backboard 12 to form third visible seams 52 at a lower edge 44 and at regular vertical intervals to define a pair of rows 54 of side-by-side pockets 20 utilized to securely hold postcards 56 or the like. The first row of the pair of rows 54 is visually interposed between the upper and lower pockets 38 and 40. The second row of the pair of rows 54 is visually lower than the lover pocket 40. A pair of side seams (not shown) are hidden under the band 32. In the preferred embodiment, there are three pockets 20 in each row though the number of pockets can be varied by shortening or lengthening the interval between the vertical seams 52.

The first and second pair of straps 16 and 18 are utilized to secure the display 10 to the seat 14 including a headrest 53. The first pair of straps 16 is shorter than the second pair of straps 18. Each of the first and second strap pairs 16 and 18 are preferably formed of hook and loop tape, again commonly referred to as Velcro® fasteners, to provide a considerable degree of size adjustment to enable to fit variously sized vehicles. One strap of each pair is provided with either the hook or loop pad while the other strap of each pair is provided with the other portion of the Velcro® fastener. The strap pairs 16 and 18 each have a fixed end 58 and a free end 60. The fixed ends 58 of the first pair of straps 16 are fastened by sewing or the like to the center of the top edge 28. The fixed ends 58 of the second pair of straps 18 are fastened by sewing or the like to the backboard 12 at the bottom edge 30.

The printed material 22 may be advertising. The front pockets 20 are sized to accommodate postcards 56, which are popular with travelers. The rear elongated pockets 38 and 40 may be used to hold elongated advertising placards 62, or act as banners. The side printed on should, of course, face outward toward the passenger in order to be visible.

To hang the display 10 from the back of the seat 14, the backboard 12 is oriented such that the rear surface 26 of the backboard 12 faces the back of the seat 14. The peel-off backing (not shown) is removed from the hook and loop pads 34 to affix the backboard 12 to the back of the seat 12. As illustrated in FIG. 1, the free ends 60 of the first pair of straps 16 are tightly wrapped around the base of the vehicle headrest 54 and then fastened together. The free ends 58 of the second pair of straps 18 are secured around an associated vehicle seat cushion 64. The pockets 20, 38 and 40 may be filled with the printed material 22. The narrow support strip 46 holds the placard in the upper pocket 38 since the free edge 45 of the upper pocket 38 is at the bottom.

A method of advertising inside a vehicle using the display 10 is also described and claimed.

From the foregoing it is to be appreciated that the present invention provides a secure display and method for neatly holding printed material in an orderly fashion in plain view of the passenger and with its contents clearly visible and accessible to the passenger.

Although a particular embodiment of the invention hag been described in detail for purposes of illustration, various modifications may be made without departing from the spirit and scope of the invention. Accordingly, the invention is not to be limited, except as by the appended claims.

I claim:

1. A method of advertising inside a taxicab or other commercial vehicle comprising the steps of:

hanging a backboard on a back of a seat of the taxicab or other commercial vehicle, the backboard having a rear and a front surface comprising a plurality of pockets for holding advertising material, said plurality of pockets having an open portion to receive and remove said advertising material, securing the backboard on the back of the seat by using a first and second pair of straps removably fastened respectively around a headrest and a seat cushion associated with the seat; and filling the plurality of pockets with advertising material through said open portion of each pocket, said plurality of pockets are a plurality of transparent pockets.

2. A method of advertising inside a taxicab or other commercial vehicle comprising the steps of:

hanging a backboard on a back of a seat of the taxicab or other commercial vehicle, the backboard having a rear and a front surface comprising a plurality of pockets for holding advertising material;

securing the backboard on the back of the seat by using a first and second pair of straps removably fastened respectively around a headrest and a seat cushion associated with the seat; and filling the plurality of pockets with advertising material;

wherein said step of filling the plurality of pockets with advertising material consists of filling the plurality of pockets with postcards.

3. A hanging advertising display for use in a taxicab or other commercial vehicle comprising in combination:

a commercial vehicle having at least one front seat having a headrest;

means for hanging a background having advertising material on a back of the seat in the vehicle;

a plurality of pockets defined in the background for holding the advertising material, said plurality of pockets having an open portion to receive and remove said advertising material, said advertising material located in each of said plurality of pockets, said advertising material being insertable and removable through said open portion of each pocket; and fastening means for securing the backboard onto the back of the seat in the vehicle, said fastening means comprising first strap means located around said headrest and second strap means located around said seat and connected to a bottom portion of the backboard for selectively and rapidly attaching or detaching said backboard with its advertising material to the back of the seat, said plurality of pockets are a plurality of transparent pockets.

4. A hanging advertising display for use in a taxicab or other commercial vehicle comprising in combination:

a commercial vehicle having at least one front seat having a headrest;

means for hanging a backboard having advertising material on a back of the seat in the vehicle;

a plurality of pockets defined in the background for holding the advertising material, said advertising material located in each of said plurality of pockets; and fastening means for securing the background onto the back of the seat in the vehicle, said fastening means comprising first strap means located around said headrest and second strap means located around said seat and connected to a bottom portion of the backboard for selectively and rapidly attaching or detaching said backboard with its advertising material to the back of the seat wherein said advertising material located in each plurality of pockets is at least one postcard.

* * * * *